(12) United States Patent
Yekutiely et al.

(10) Patent No.: US 6,508,120 B2
(45) Date of Patent: Jan. 21, 2003

(54) FLUID LEVEL MONITOR WITH AT LEAST PARTIALLY SUBMERSIBLE BUOYANT ELEMENT

(76) Inventors: David Yekutiely, 24 Sheshet Hayamim St., Ramat HaSharon 47247 (IL); Barak Yekutiely, 1278 Wellington Ave., Teaneck, NJ (US) 07666

( * ) Notice: Subject to any disclaimer, the term of this patent is extended or adjusted under 35 U.S.C. 154(b) by 0 days.

(21) Appl. No.: 09/939,513

(22) Filed: Aug. 24, 2001

(65) Prior Publication Data

US 2002/0029633 A1 Mar. 14, 2002

Related U.S. Application Data

(63) Continuation of application No. PCT/IL00/00853, filed on Dec. 22, 2000.

(51) Int. Cl.[7] .............................................. G07F 23/10
(52) U.S. Cl. ............................. 73/309; 73/313; 73/321; 33/716; 318/482
(58) Field of Search ........................ 73/305, 306, 309, 73/313, 314, 319, 321; 33/716; 318/482

(56) References Cited

U.S. PATENT DOCUMENTS

| | | | | |
|---|---|---|---|---|
| 93,158 A | * | 8/1869 | Amsden ........................ 73/321 |
| 3,017,771 A | * | 1/1962 | Bonhomme .................. 310/15 |
| 3,148,542 A | * | 9/1964 | Clift, Jr. ........................ 33/716 |
| 3,240,064 A | * | 3/1966 | Sharp ........................... 73/321 |
| 4,065,226 A | * | 12/1977 | Campbell ..................... 73/321 |
| 4,244,219 A | | 1/1981 | Takahashi ..................... 73/309 |
| 4,786,846 A | * | 11/1988 | Uchida ......................... 318/482 |
| 5,533,392 A | * | 7/1996 | Kira ............................. 33/720 |
| 5,806,363 A | | 9/1998 | Khoi et al. ................... 73/313 |
| 6,021,664 A | * | 2/2000 | Granato et al. .............. 166/264 |

FOREIGN PATENT DOCUMENTS

GB        1015118        12/1965

* cited by examiner

Primary Examiner—Hezron Williams
Assistant Examiner—Michael Cygan
(74) Attorney, Agent, or Firm—Dekel Patent Ltd.; David Klein

(57) ABSTRACT

This invention discloses a fluid level monitor including a buoyant element suspended from a filament wound on a spool, a load sensor that senses a tensile force in the filament and a rotation sensor that senses the rotation of the spool around which the filament is wound, wherein the buoyant element is adapted to be initially at least partially submerged at an equilibrium position at an initial level of a fluid, thereby creating a nominal tensile force in the filament, wherein a change in the level of the fluid changes the tensile force in the filament, a positive change in the tensile force corresponding to a downward movement of the buoyant element and a negative change in the tensile force corresponding to an upward movement of the buoyant element, wherein the rotation of the spool corresponds to an amount of distance traveled by the buoyant element.

11 Claims, 3 Drawing Sheets

FLUID LEVEL MONITOR WITH AT LEAST PARTIALLY SUBMERSIBLE BUOYANT ELEMENT

This is a continuation of international application Ser. No. PACT/IL00/00853, filed Dec. 22, 2000, the entire disclosure of which is hereby incorporated by reference.

FIELD OF THE INVENTION

The present invention relates generally to fluid level gauges or monitors, and particularly to a fluid level gauge or monitor for use with water or fuel wells, and the like.

BACKGROUND OF THE INVENTION

In many localities, water is supplied to consumers by pumping the water from wells. Water wells can be quite deep, some reaching depths of over 500 meters. In states or countries which have low amounts of precipitation, well water is a precious commodity, and wells are intensively pumped to meet the consumer demand. In such cases, the level of the water in the well can reach low levels, and the pumped water can become mixed with sand or sea water. It is readily understood that such a situation is undesirable and intolerable. The sand that is pumped with the water can foul and damage irrigation pumps of agricultural consumers. The quality of water mixed with sea water is intolerable and dangerous for drinking purposes. It is thus imperative to monitor the water level in the well, in order to know when to stop pumping water from the well. Unfortunately, the prior art has no known solution for real-time monitoring of water level in a well, especially deep wells.

SUMMARY OF THE INVENTION

The present invention seeks to provide a novel fluid level monitor (or gauge, the terms being used interchangeably herein) that can be used for real-time monitoring of water level in a well. Although the present invention is described herein for water wells, nevertheless the invention is applicable for any kind of fluid, such as oil.

The present invention includes a buoyant element that is initially partially submerged at an equilibrium position in a fluid. The buoyant element is suspended from a filament wound on a spool. There is a nominal tensile force in the filament due to the partially submerged weight of the buoyant element. The tension in the filament is sensed by a load sensor. A change in the level of the fluid changes the tensile force in the filament. By comparing the sensed tension to the nominal tension in the filament, the load sensor can sense the direction of the upward or downward movement of the buoyant element. A rotation sensor is provided for sensing the rotation of a spool or bobbin around which the filament is wound. This rotation is interpreted as an amount of distance traveled by the buoyant element. Combined with the force direction as sensed by load sensor, the distance the buoyant element has traveled and in what direction is known. Thus the level of the fluid can be constantly monitored.

A computerized system of fluid level monitors for monitoring a plurality of wells in a locality or state is also provided.

There is thus provided in accordance with a preferred embodiment of the present invention a fluid level monitor including a fluid level monitor including a buoyant element suspended from a filament wound on a spool, a load sensor that senses a tensile force in the filament, and a rotation sensor that senses the rotation of the spool around which the filament is wound, wherein the buoyant element is adapted to be initially at least partially submerged at an equilibrium position at an initial level of a fluid, thereby creating a nominal tensile force in the filament, wherein a change in the level of the fluid changes the tensile force in the filament, a positive change in the tensile force corresponding to a downward movement of the buoyant element and a negative change in the tensile force corresponding to an upward movement of the buoyant element, wherein the rotation of the spool corresponds to an amount of distance traveled by the buoyant element.

In accordance with a preferred embodiment of the present invention the buoyant element is disposed inside a generally vertical elongate tube.

Further in accordance with a preferred embodiment of the present invention at least one friction-reducing member is mounted on an external surface of the buoyant element.

Still further in accordance with a preferred embodiment of the present invention a motor is attached to the spool for rotating the spool so as to raise or lower the buoyant element.

Additionally in accordance with a preferred embodiment of the present invention the filament is also wound about a bobbin, and the bobbin is mounted in a support member that is attached to the load sensor, the load sensor sensing an upward or downward movement of the support member and the buoyant element.

In accordance with a preferred embodiment of the present invention a toothed disc is coaxially mounted with at least one of the spool and the bobbin, and a proximity sensor is mounted in proximity to teeth of the disc.

Further in accordance with a preferred embodiment of the present invention the proximity sensor includes at least one of an induction sensor and a capacitance sensor.

Still further in accordance with a preferred embodiment of the present invention a second proximity sensor is mounted near the filament remote from the spool.

Additionally in accordance with a preferred embodiment of the present invention a controller is in electrical communication with the load sensor and the rotation sensor.

There is also provided in accordance with a preferred embodiment of the present invention a system for monitoring fluid level in wells, including a plurality of the fluid level monitors, and a central processor in communication with the monitors. The monitors may be remotely controlled by a remote controller and/or by the central processor.

BRIEF DESCRIPTION OF THE DRAWINGS

The present invention will be understood and appreciated more fully from the following detailed description, taken in conjunction with the drawings in which:

FIGS. 2A–2C are simplified pictorial illustrations of operation of the fluid level monitor of FIG. 1, wherein FIG. 2A illustrates a buoyant element of the fluid level monitor at an initial, equilibrium position in a fluid, FIG. 2B illustrates the buoyant element out of the fluid, and FIG. 2C illustrates the buoyant element over-submerged in the fluid.

DETAILED DESCRIPTION OF A PREFERRED EMBODIMENT

Figure 1:
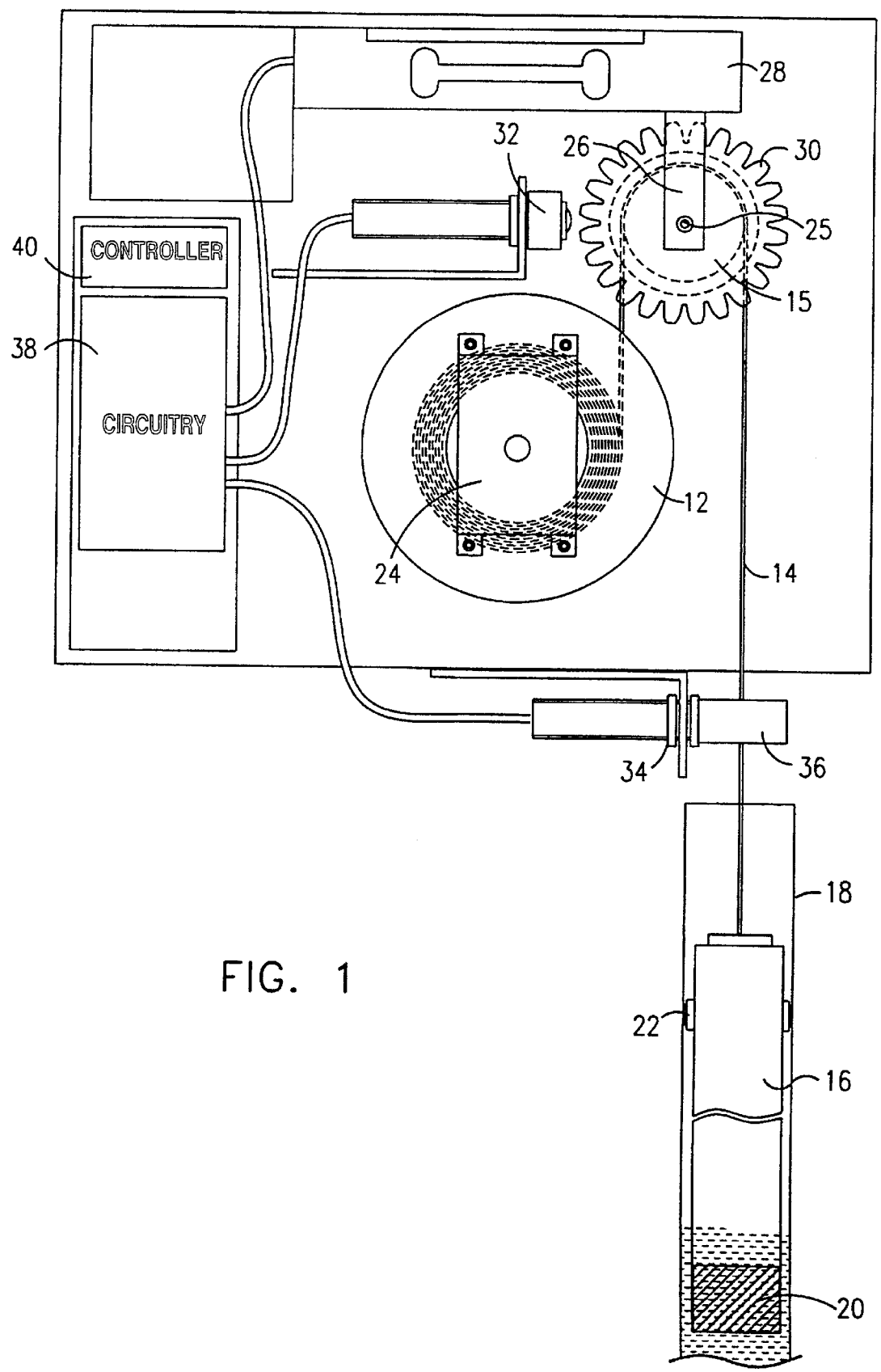
FIG. 1 is a simplified pictorial, partially cutaway illustration of a fluid level monitor constructed and operative in accordance with a preferred embodiment of the present invention.

Reference is now made to FIG. 1 which illustrates fluid level monitor 10 constructed and operative in accordance with a preferred embodiment of the present invention.

Fluid level monitor 10 preferably includes a spool 12 of a filament 14. The term "filament" encompasses any string, thread, fishing line, cord or rope and the like. Filament 14 is preferably wrapped one or more times around a bobbin 15, and an end of filament 14 is attached to a buoyant element 16. Buoyant element 16 is preferably disposed inside a generally vertical elongate tube 18. Such a tube is generally installed in most water wells for testing and sampling purposes, and runs virtually the entire depth of the well. The present invention exploits the fact that such a tube is present in water wells, and that such a tube offers a clean, generally undisturbed environment for buoyant element 16.

Buoyant element 16 may be fashioned in the form of a generally hollow cylinder with a weight 20 disposed at the bottom thereof (Weight 20 may fill some or all of the internal volume of buoyant element 16.) It is appreciated, however, that the invention is not limited to such a cylindrical shape, and buoyant element 16 may have any other suitable shape. In accordance with a preferred embodiment of the present invention, there are one or more friction-reducing members 22, such as rollers or low-friction pads, mounted on an external surface of buoyant element 16. Friction-reducing members 22 help ensure smooth travel of buoyant element 16 inside tube 18, and prevent buoyant element 16 from getting snagged or caught in tube 18.

Spool 12 is preferably rotated by means of a motor 24 attached thereto. Motor 24 may be a compact servomotor, for example, mounted on a central shaft of spool 12. Rotation of spool 12 either raises or lowers buoyant element 16. Bobbin 15 is preferably supported by bearings 25 mounted in a support member 26 that is attached to a load sensor 28. Load sensor 28 may be a load cell, strain or tension gauge, which can sense upward or downward flexure or movement of support member 26 (and with it upward or downward movement of buoyant element 16).

A toothed disc 30, such as a gear, is preferably coaxially mounted with bobbin 15. A proximity sensor 32 is preferably mounted in proximity to teeth 31 of disc 30. Proximity sensor 32 is preferably an induction sensor, but can also be a capacitance sensor. The assembly of spool 12, motor 24, bobbin 15, disc 30, load sensor 28 and proximity sensor 32 is preferably mounted in a housing 33. A second proximity sensor 34 is preferably mounted on a bracket 36 near an entrance/exit of filament 14 to housing 33.

Load sensor 28, motor 24 and proximity sensors 32 and 34 are preferably in electrical communication with circuitry 38 of an electronic controller 40. Circuitry 38 preferably includes any components typically used for operating the above-named parts, such as motor controls or solid state relays and the like, as is well known to the skilled artisan.

Figure 2A:
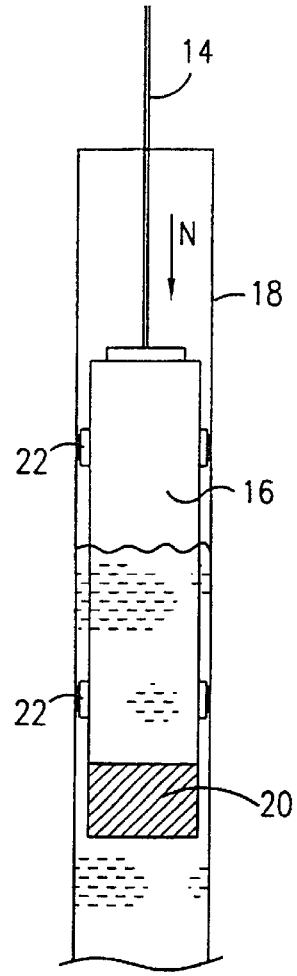
Figure 2B:
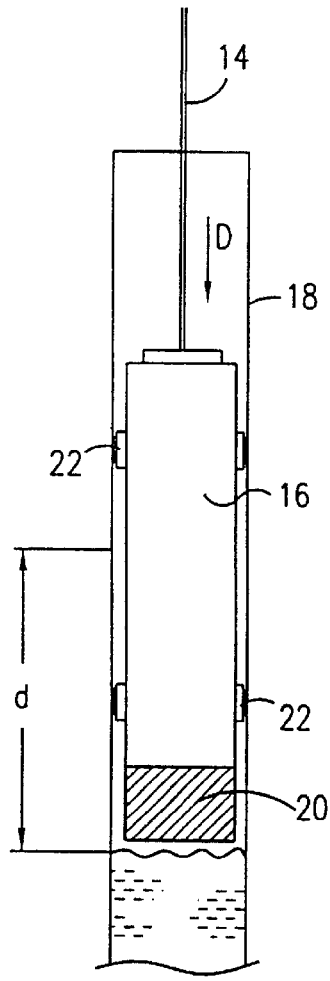
Figure 2C:
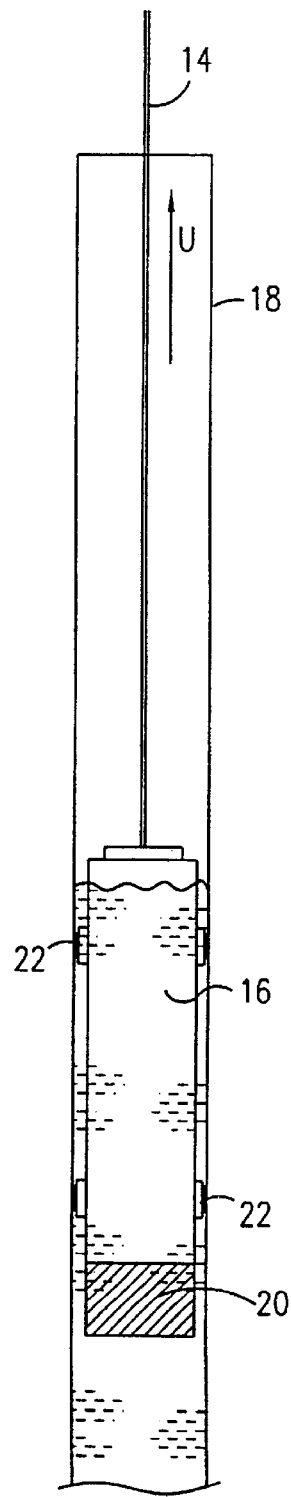

The operation of fluid level monitor 10 is now described with further reference to FIGS. 2A–2C. Buoyant element 16 partially floats at an initial level of water in tube 18, as seen in FIG. 2A. Buoyant element 16 and filament 14 are in equilibrium, i.e., buoyant element 16 has reached substantially a stable position in the water, and there is a nominal tensile force N in filament 14 due to the partially submerged weight of buoyant element 16. Nominal tensile force N is taken as the zero reference value. If the water level drops a distance d, buoyant element 16 is no longer in the water, as seen in FIG. 2B. The out-of-water weight of buoyant element 16 imparts a downward tensile force D on filament 14. Force D is transferred to and sensed by load sensor 28 as being greater than force N. This information is sent to controller 40, which understands the information to mean that force D is a downward force. Thus by comparing the sensed tension to the nominal tension in filament 14, load sensor 28 and controller 40 sense the direction of the movement of buoyant element 16. It is noted that it is not necessary for load sensor 28 to measure the exact magnitude of force D. Instead, it is sufficient to know that force D is greater than force N.

Controller 40 thereupon signals motor 24 to rotate spool 12 in a counterclockwise direction in the sense of FIG. 1, thereby spooling out filament 14 from spool 12. Bobbin 15 also turns counterclockwise, and buoyant element 16 descends into the water. As bobbin 15 turns, proximity sensor 32 counts the number of teeth 31 that pass thereby. The number of teeth 31 is interpreted and converted by controller 40 into the distance that buoyant element 16 has traveled. Proximity sensor 32 and toothed disc 30 thus act as a rotation sensor. (Although other devices, such as a shaft encoder, could be used for this purpose, the structure of the present invention is significantly simpler and less expensive.) It is appreciated that the rotation of spool 12 can be sensed, instead of that of bobbin 15. Combined with the force direction as sensed by load sensor 28, controller 40 knows the distance buoyant element 16 has traveled and in what direction.

Buoyant element 16 descends into the water to the position shown in FIG. 2C. It is seen that buoyant element 16 has "overshot" its equilibrium floating position, and is now over-submerged beyond its equilibrium point in the water. The submergence of buoyant element 16 causes filament 14 to be in less tension than the nominal tensile force N associated with the equilibrium position of buoyant element 16 in the water. In other words, the submergence of buoyant element 16 imparts an upward force U on filament 14. Force U is sensed by load sensor 28 as being less than force N. This information is sent to controller 40, which understands the information to mean that force U is an upward force.

Controller 40 thereupon signals motor 24 to rotate spool 12 in a clockwise direction in the sense of FIG. 1, thereby winding filament 14 onto spool 12. Bobbin 15 also turns clockwise, and buoyant element 16 ascends. As mentioned above, as bobbin 15 turns, proximity sensor 32 counts the number of teeth 31 that pass thereby. The number of teeth 31 is interpreted and converted by controller 40 into the distance that buoyant element 16 has traveled. The process of raising and lowering buoyant element 16 by means of load sensor 28 and controller 40 is repeated until buoyant element 16 is generally in its equilibrium position, i.e., the tensile force in filament 14 is equal to N. Preferably controller 40 will stop rotating spool 12 when the tensile force in filament 14 is within a certain predetermined tolerance near the value of N, or when a predetermined number of incremental direction changes have been made in a predetermined period of time. Once the equilibrium position has been reached, the distance that buoyant element 16 has traveled is reported or displayed by controller 40.

It is appreciated that the same explanation holds true, mutatis mutandis, for the situation wherein the water rises in tube 18, and buoyant element 16 accordingly rises as well.

Second proximity sensor 34 can be used to sense if the upper portion of buoyant element 16 has ascended to the level of bracket 36. Once buoyant element 16 has risen that high, second proximity sensor 34 signals controller 40 to stop movement of buoyant element 16. In this manner, buoyant element 16 is prevented from abutting against housing 33. Alternatively or additionally, bobbin 15 may be provided with a clutch or ratchet mechanism, so that bobbin 15 does not over-rotate and cause buoyant element 16 to abut against housing 33.

Figure 3:
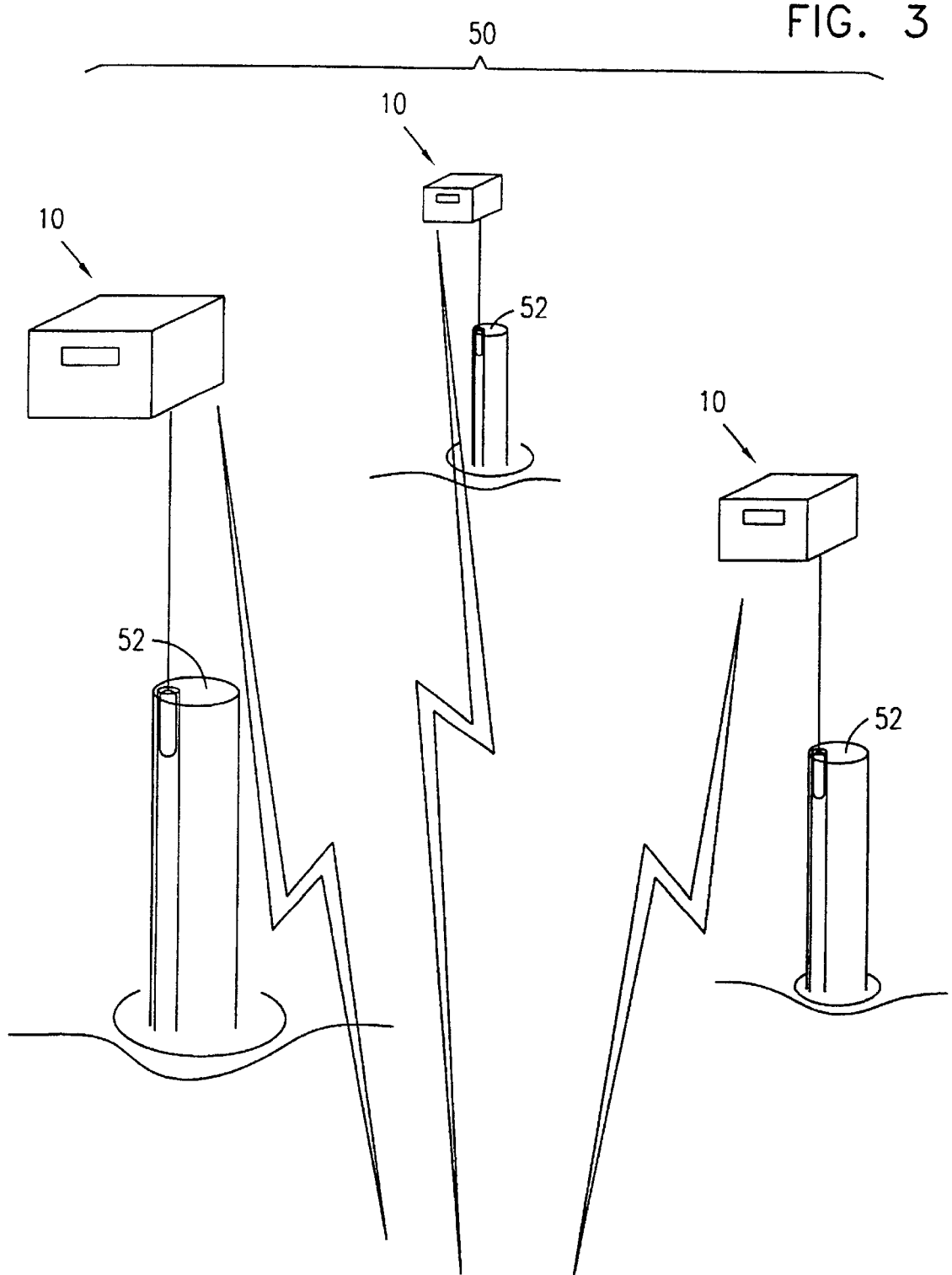
FIG. 3 is a simplified illustration of a system of fluid level monitors for monitoring a plurality of wells, constructed and operative in accordance with a preferred embodiment of the present invention.

Reference is now made to FIG. 3 which illustrates a system 50 of fluid level monitors 10 for monitoring a plurality of wells 52, constructed and operative in accordance with a preferred embodiment of the present invention. System 50 preferably includes a central processor 54 in wired or wireless communication with all of the monitors 10 in the system. Monitors 10 may be remotely controlled by a remote controller 56 and/or by central processor 54 itself By using system 50, a municipality or water authority can easily monitor all of the wells in a locality or state, and can know which well is low and stop pumping supply water from that well. It is noted that in the prior art, it has not been possible to know which of the many wells (sometimes thousands) is low and is contributing to sand or sea water problems in the water supplied to consumers. With the present invention, this problem is solved.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A fluid level monitor comprising:
   a buoyant element suspended from a filament wound on a spool;
   a load sensor that senses a tensile force in said filament;
   a proximity sensor mounted near said filament remote from said spool; and
   a rotation sensor that senses the rotation of said spool around which said filament is wound, wherein said buoyant element is adapted to be initially at least partially submerged at an equilibrium position at an initial level of a fluid, thereby creating a nominal tensile force in said filament, wherein a change in the level of the fluid changes the tensile force in the filament, a positive change in the tensile force corresponding to a downward movement of said buoyant element and a negative change in the tensile force corresponding to an upward movement of said buoyant element, wherein the rotation of said spool corresponds to an amount of distance traveled by said buoyant element.

2. The monitor according to claim 1 wherein said buoyant element is disposed inside a generally vertical elongate tube.

3. The monitor according to claim 1 wherein at least one friction-reducing member is mounted on an external surface of said buoyant element.

4. The monitor according to claim 1 and further comprising a motor attached to said spool, for rotating said spool so as to raise or lower said buoyant element.

5. The monitor according to claim 1 wherein said filament is also wound about a bobbin, and said bobbin is mounted in a support member that is attached to said load sensor, said load sensor sensing an upward or downward movement of said support member and said buoyant element.

6. The monitor according to claim 5 and further comprising a toothed disc coaxially mounted with at least one of said spool and said bobbin, and another proximity sensor mounted in proximity to teeth of said disc.

7. The monitor according to claim 6 wherein said proximity sensor comprises at least one of an induction sensor and a capacitance sensor.

8. The monitor according to claim 1 and further comprising a controller in electrical communication with said load sensor and said rotation sensor.

9. A system for monitoring fluid level in wells, comprising:
   a plurality of fluid level monitors, each monitor comprising:
      a buoyant element suspended from a filament wound on a spool;
      a load sensor that senses a tensile force in said filament;
      a proximity sensor mounted near said filament remote from said spool; and
      a rotation sensor that senses the rotation of said spool around which said filament is wound, wherein said buoyant element is adapted to be initially at least partially submerged at an equilibrium position at an initial level of a fluid, thereby creating a nominal tensile force in said filament, wherein a change in the level of the fluid changes the tensile force in the filament, a positive change in the tensile force corresponding to a downward movement of said buoyant element and a negative change in the tensile force corresponding to an upward movement of said buoyant element, wherein the rotation of said spool corresponds to an amount of distance traveled by said buoyant element; and
   a central processor in communication with said monitors.

10. The system according to claim 9 wherein said monitors are remotely controlled by a remote controller.

11. The system according to claim 9 wherein said monitors are remotely controlled by said central processor.

* * * * *